United States Patent [19]
Nichols et al.

[11] Patent Number: 6,126,400
[45] Date of Patent: Oct. 3, 2000

[54] THERMAL BARRIER COATING WRAP FOR TURBINE AIRFOIL

[75] Inventors: Glenn H. Nichols, Indian Springs; Judd D. Tressler, Mason, both of Ohio

[73] Assignee: General Electric Company, Cincinnati, Ohio

[21] Appl. No.: 09/243,355

[22] Filed: Feb. 1, 1999

[51] Int. Cl.$^7$ ................................................. B32B 18/00
[52] U.S. Cl. .......................... 416/241 B; 416/241 R; 416/95; 415/177
[58] Field of Search .................................. 415/177, 178, 415/191, 200; 416/95, 241 R, 241 B, 229 A

[56] References Cited

U.S. PATENT DOCUMENTS

| | | | |
|---|---|---|---|
| 4,639,399 | 1/1987 | Aprigiiano | 428/623 |
| 5,209,645 | 5/1993 | Kojima et al. | 416/241 B |
| 5,238,752 | 8/1993 | Duderstadt et al. | 428/623 |
| 5,429,478 | 7/1995 | Krizan et al. | 415/173.7 |
| 5,856,027 | 1/1999 | Murphy | 428/623 |
| 5,981,088 | 11/1999 | Bruce et al. | 428/633 |

OTHER PUBLICATIONS

Brady, George S., and Clauser, Henry R. "Materials Handbook: 13th Edition", McGraw–Hill, Inc., New York, Dec. 1991, pp. 34–39.

*Primary Examiner*—Edward K. Look
*Assistant Examiner*—Matthew T. Shanley
*Attorney, Agent, or Firm*—Andrew C. Hess; Rodney M. Young

[57] ABSTRACT

An airfoil having extended life due to reduction in stresses. The stresses are reduced by extending the thermal barrier coating below the radius between the outer band perimeter and the inner flow path surfaces and tapering the coating thickness. This additional tapered thermal barrier coating reduces the temperature gradient across a region already having high mechanical stresses resulting from geometric considerations thereby lowering thermally-induced stresses so that low cycle fatigue life is improved.

25 Claims, 3 Drawing Sheets

THERMAL BARRIER COATING WRAP FOR TURBINE AIRFOIL

BACKGROUND OF THE INVENTION

1. Field of the Invention

This invention relates to thermal barrier coating systems for airfoils used in the turbine portions of gas turbine engines, and specifically to an improved coating arrangement for segments consisting of a plurality of airfoils.

2. Discussion of the Prior Art

Airfoils, typically blades and vanes, used in the turbine portions of gas turbine engines, such as jet engines, are typically made from superalloy materials. These materials are utilized because of their high temperature properties and the ability to withstand the corrosion and oxidation resulting from the combustion exhaust typically occurring in such engines. As the temperatures have been driven constantly higher, it has been necessary to not only modify the compositions of these materials, but also it has been necessary to add thermal barrier coatings and cooling channels to allow continued performance.

Typically, these airfoils operate under conditions of stress at very high temperatures, so that not only are oxidation and corrosion a concern, but fatigue, particularly low cycle fatigue, is also a concern. These stresses can be caused by the operating conditions experienced by the part, or may be inherent in the mechanical design and/or fabrication of the part and can shorten the operating life of an article. Fortunately, these conditions occur over an extended period of time and provide ample warning signs that a problem exists. Nevertheless, it is desirable to identify the sources of fatigue whenever possible, so that the problems due to fatigue can be reduced or eliminated. One effective way addressing the problem of fatigue is to reduce stresses in the part. If the stresses can be reduced below a critical threshold value, fatigue can be eliminated. However, even if the stresses cannot be reduced below the critical threshold value, any reduction in stresses can result in an increased life for the part.

Airfoils such as turbine blades in the hot turbine section of a jet engine have shown early signs of distress in a region near the tip of the airfoil. These blades are coated with a thermal barrier coating along the tip of the airfoil, in the region where the airfoil interfaces with the shroud assembly and along the leading edge of the airfoil from the tip of the airfoil to the base. The thermal barrier coating is applied to improve the thermal performance of the blade, allowing it to operate at higher temperatures. Because the high temperature environment and stresses resulting from it cannot be changed and will only be modified toward increasing temperatures, it would be advantageous to reduce the stresses encountered in this region of the blade to eliminate or to delay the onset of these early signs of distress.

Improvements in manufacturing technology and materials are the keys to increased performance and reduced costs for many articles. As an example, continuing and often interrelated improvements in processes and materials have resulted in major increases in the performance of aircraft gas turbine engines. The present invention is an improvement in manufacturing technology in the application of materials to bring about improved performance of airfoils in the turbine portion of a gas turbine engine.

BRIEF SUMMARY OF THE INVENTION

The present invention is an improved airfoil in which the thermal barrier coating system reduces stresses in a region of the airfoil near its tip, thereby at least extending the life of the airfoil. The thermal barrier system of the present invention can be applied to existing airfoils as a repair or it may be applied to new airfoils.

Airfoils typically, are hollow articles having outer surfaces over which flow the hot gases of combustion from the combuster portion of the engine.

These outer or flow path surfaces include a leading edge, a trailing edge, a pressure side on a concave side of the airfoil extending from the leading edge to the trailing edge, a convex side, opposite the concave side, an outer band perimeter that includes an airfoil tip extending toward the shroud of the turbine section, and an outer band portion, and a fillet radius forming a smooth contour between the outer band portion of the perimeter and the leading edge, the trailing edge, the concave side of the airfoil and the convex side of the airfoil. High stresses exist in the region of the fillet radius due to a combination of mechanical and thermal stresses. The present invention reduces the concentration of stresses in the region of the fillet radius by extending the thermal barrier coating to include a preselected region of the flow path surface on at least one side of the airfoil surface between a trailing edge and about a midpoint between the trailing edge and the leading edge.

The thermal barrier coating is applied over at least the fillet radius and the outer band perimeter in this region. The thermal barrier coating extends onto the flow path surface for a sufficient distance below the fillet radius to reduce cumulative stresses resulting from a combination of mechanically-induced stresses from the fillet radius and the larger mass outer band and service-induced thermal stresses. The thermal barrier system includes a bond coat applied over the preselected region. An aluminide environmental coating is applied over the bond coat and a ceramic top coat is applied over the aluminide coating and the bond coat. This system reduces the overall stresses by reducing the thermal stresses in this region.

When the thermal barrier coating is applied as set forth by the present invention, the cumulative stresses are reduced in the area of the fillet radius, thereby providing an advantage of extending the life of the airfoil.

Another advantage of the present invention is that it may be applied to existing airfoils which are not coated in this region, without having to strip any pre-existing- thermal barrier coatings. The thermal barrier coatings may be applied to these regions of new airfoils as well. The fatigue life of either new or existing airfoils is thereby extended.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Airfoils used in the turbine portion of a jet engine are made from superalloy materials that are typically cast, and are generally hollow, the interior consisting of a labyrinth of passageways through which cooling air flows. The exterior of the airfoils generally are referred to as the flow path surfaces, since these surfaces are exposed to the hot gases of combustion which flow through the engine providing the energy for forward thrust and for powering the compression portion of the engine. Airfoils may be blades, which rotate, or vanes, which are fixed in position in relation to a gas turbine engine. Blades are attached to rotors through a base, thereby rotating with the rotor. The base is not considered part of the flow path surface.

Figure 1:
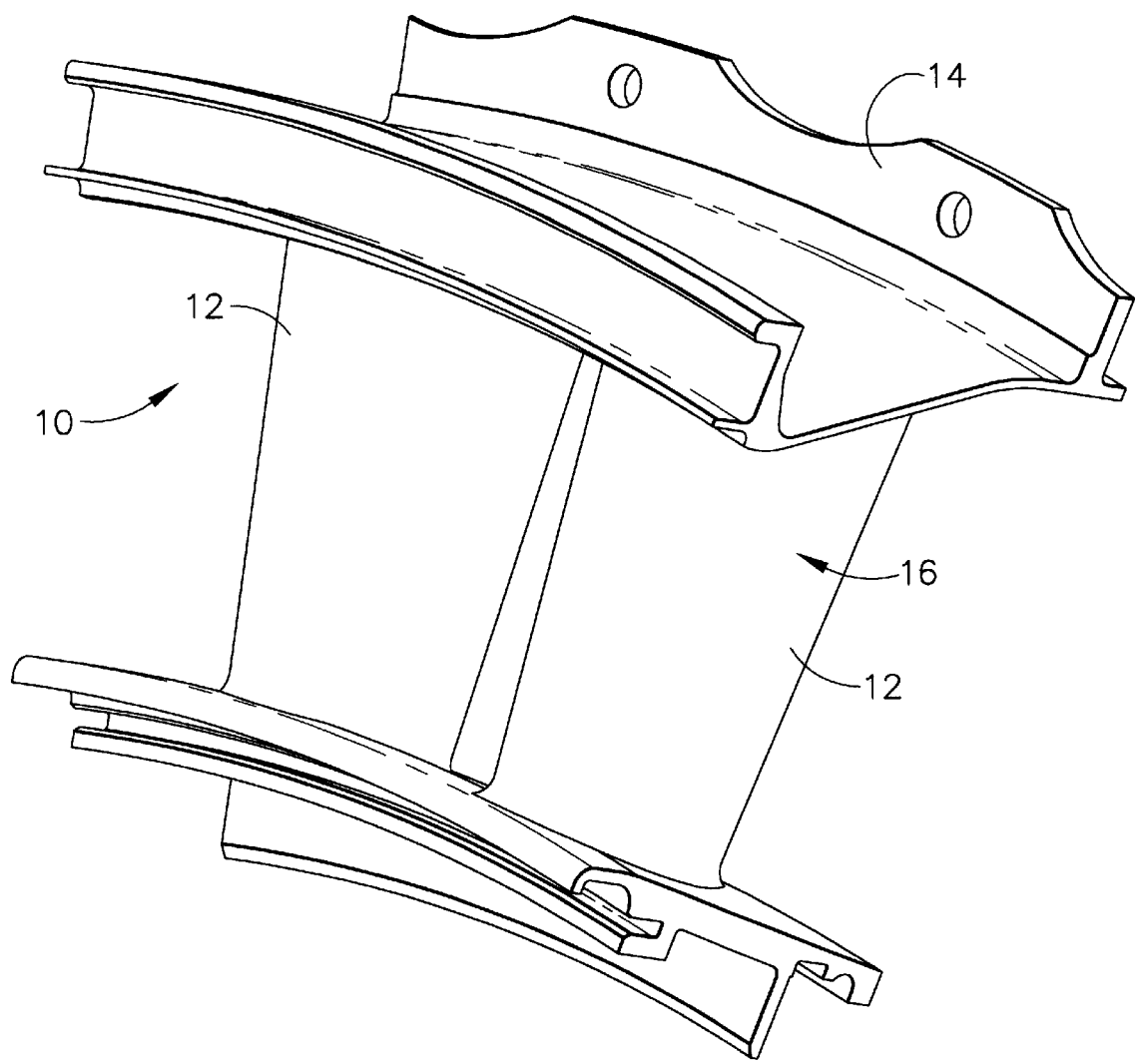
FIG. 1 is perspective of a nozzle segment in which the segment is a single casting having two airfoils.

Referring to FIG. 1, which is a perspective of a nozzle segment 10 in which the segment is a single casting having two airfoils 12. The casting may be made from any material and typically is made from a superalloy casting. The material will vary from engine to engine depending on the design and requirements, but for a high bypass turbofan (CF6) engines the high pressure turbine nozzle is typically constructed from Rene 80, a well known superalloy. The outer band 14 has a relatively large mass compared to the airfoil body 16.

Figure 2:
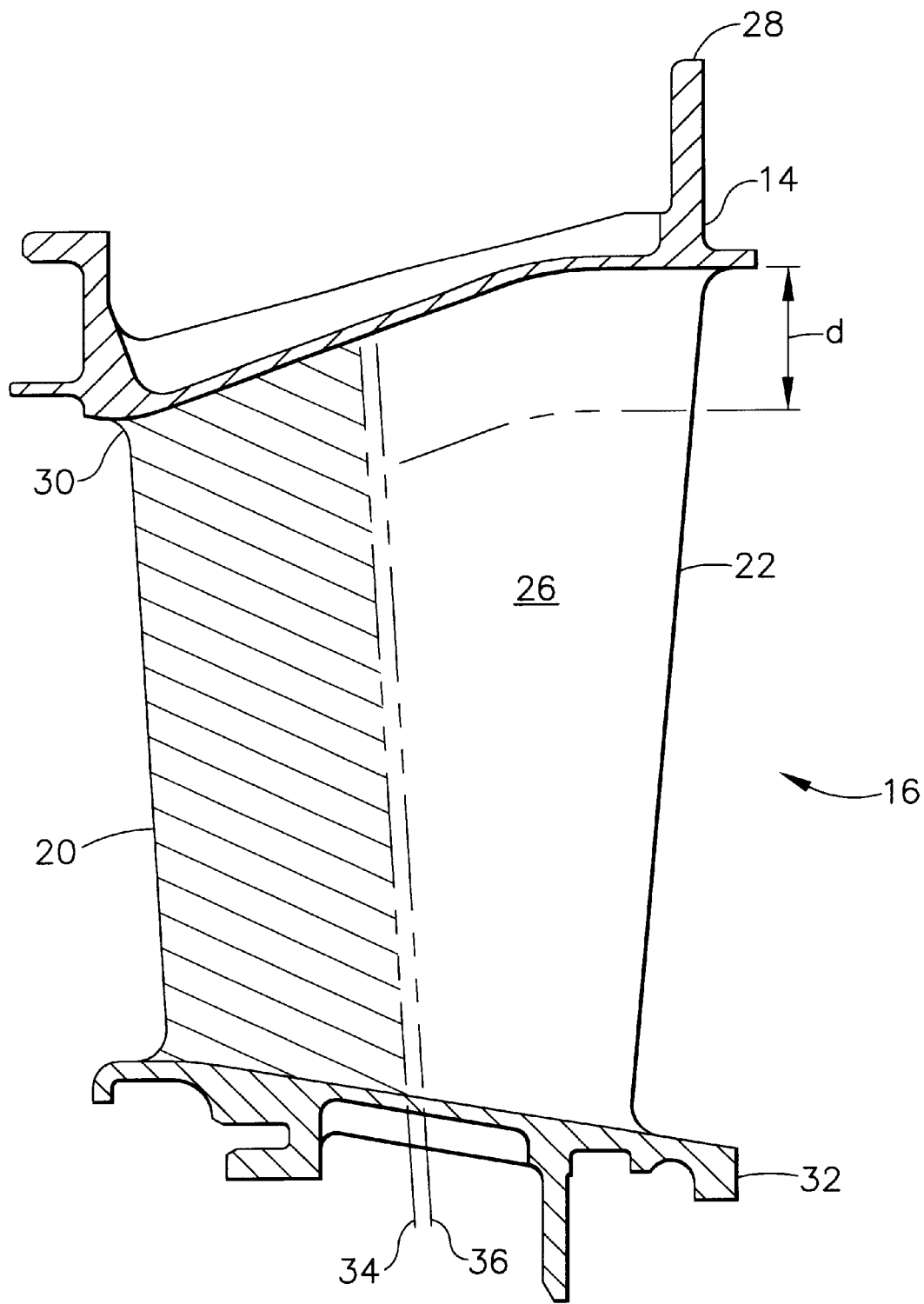
FIG. 2 is a cross-section of a nozzle segment of FIG. 1 in which thermal barrier coating of the present invention is applied to supplement preexisting thermal barrier coating.

Referring now to FIG. 2, which is a cross-section of an existing nozzle segment of FIG. 1 that includes thermal barrier coating applied in accordance with the present invention, the airfoil body 16 is comprised of a leading edge 20, a trailing edge 22, a concave side (not shown) extending between the leading edge 20 and the trailing edge 22 on one side of the airfoil and a convex side 26 extending between the leading edge and the trailing edge. The outer band 14 that includes tips 28 is connected to the airfoil body 16 by a smooth fillet radius 30. The base 32 of the nozzle segment is connected to airfoil body 16 opposite tips 28. In prior art embodiments, a thermal barrier coating comprised of a bond coat was applied to tips 28 and outer band 14 and terminating in the vicinity of or on fillet radius 30. The bond coat was also applied to the leading edge 20 from the outer band 14 to base 32 and to a line 34 approximately bisecting the airfoil as indicated by the hatched area of FIG. 2. A thermal barrier coating, typically yttrium-stabilized zirconia (YSZ) was applied over the bond coat to a thickness of 0.012–0.015 inches. Some overspray of the YSZ was permitted in the area between line 34 and 36. However, the areas not requiring YSZ were usually masked, resulting in a sharp transition between the regions having the thermal barrier coating and adjacent regions.

Because of the differences in mass between outer band 14 and body 16, a certain amount of stresses are introduced to blades at the juncture simply of the outer band and body as a matter of thermal stresses resulting from heat transfer from a large mass to a much smaller mass. Additive to these stresses are the mechanical stresses due to the effects of the transition radius 30. Finally, additional stresses resulted from the effects of the termination of the thermal barrier coating (TBC) in the region or the transition radius.

The present invention reduces these stresses from the effects of terminating the thermal coating in the region of the transition radius by extending the coating below radius 30 for a distance sufficient to reduce the thermal stresses in the region of radius 30 resulting from the abrupt termination of the TBC in the region of radius 30, thereby reducing the overall accumulation of stresses in this region. This distance is indicated by d in FIG. 2. It is preferred that this distance d extend from the fillet radius in the direction of the base such that at least about 20% of the span between the radius and the base is coated. It is preferred that d be at least about 0.5" and preferably in the range of 0.5" to 0.6" for an airfoil such as the one found on the CF6 engine, but larger or smaller values are acceptable as long as the stresses resulting from the transition are lowered. Since nozzle segment 10 is comprised of two airfoils 12, the application of the bond coat and TBC is limited by the ability of the spray nozzles used for their applications to effectively apply coating between the airfoils 12. Thus, the TBC is applied to at least a portion of body 16 from line 36 bisecting the airfoil to the trailing edge for a distance d so that the thermal barrier coating applied to the body blends smoothly with the preexisting thermal barrier coating covering the leading edge region so that the TBC is extended from the line bisecting the airfoil toward the trailing edge. For airfoils such as those found in a CF6 application, this coating will extend from the leading edge region toward the trailing edge about at least another 0.9". Preferably, the TBC is applied to both sides of each airfoil, but the ability of the nozzle to apply material may limit the application of material to the portions of the airfoils which face each other. The bond coat and the ceramic top coat are both applied using air plasma spray and line-of-sight application techniques. In addition, the portion of the trailing edge on the concave or pressure side includes cooling holes. Because it is unacceptable to have these holes adversely impacted by coating, it is necessary to mask these holes to prevent blockage by the TBC. This is an acceptable compromise since the cooling film resulting from the air flow assists in keeping this region cool.

While the airfoils may be masked so that a TBC may be applied to full thickness, it is preferred that the TBC be tapered from full thickness, 0.0120–015" at radius 30 to about 0.002–0.005 inches at a preferred distance d of 0.5–0.6". Thus, assuming a linear taper, the preferred slope of the TBC thickness is in the range of about 0.020–0.150 in./in. and most preferably 0.021–0.140 in./in. This further reduces the possibility of thermally-induced stresses in the vicinity of the termination of the TBC.

The thermal barrier coating system of the present invention is also applied in a manner somewhat different than the prior art thermal barrier coating systems. First, the bond coat, a MCrAlY(X) where M is at least one element selected from the group consisting of Ni, Co and Fe and X is at least one element selected from the group consisting of Ti, Ta, Ru, Pt, Si, B, C, Hf, and Zr is applied by an air plasma spray process. The segment is then aluminided using a typical vapor phase aluminiding procedure. Finally, a the ceramic topcoat, 7% Yttria-Stabilized Zirconia (7YSZ) is applied over the bond coat in the region set forth above by air plasma spraying, which is an improvement over the low pressure plasma spray methods previously used to apply ceramic topcoats.

Figure 3:
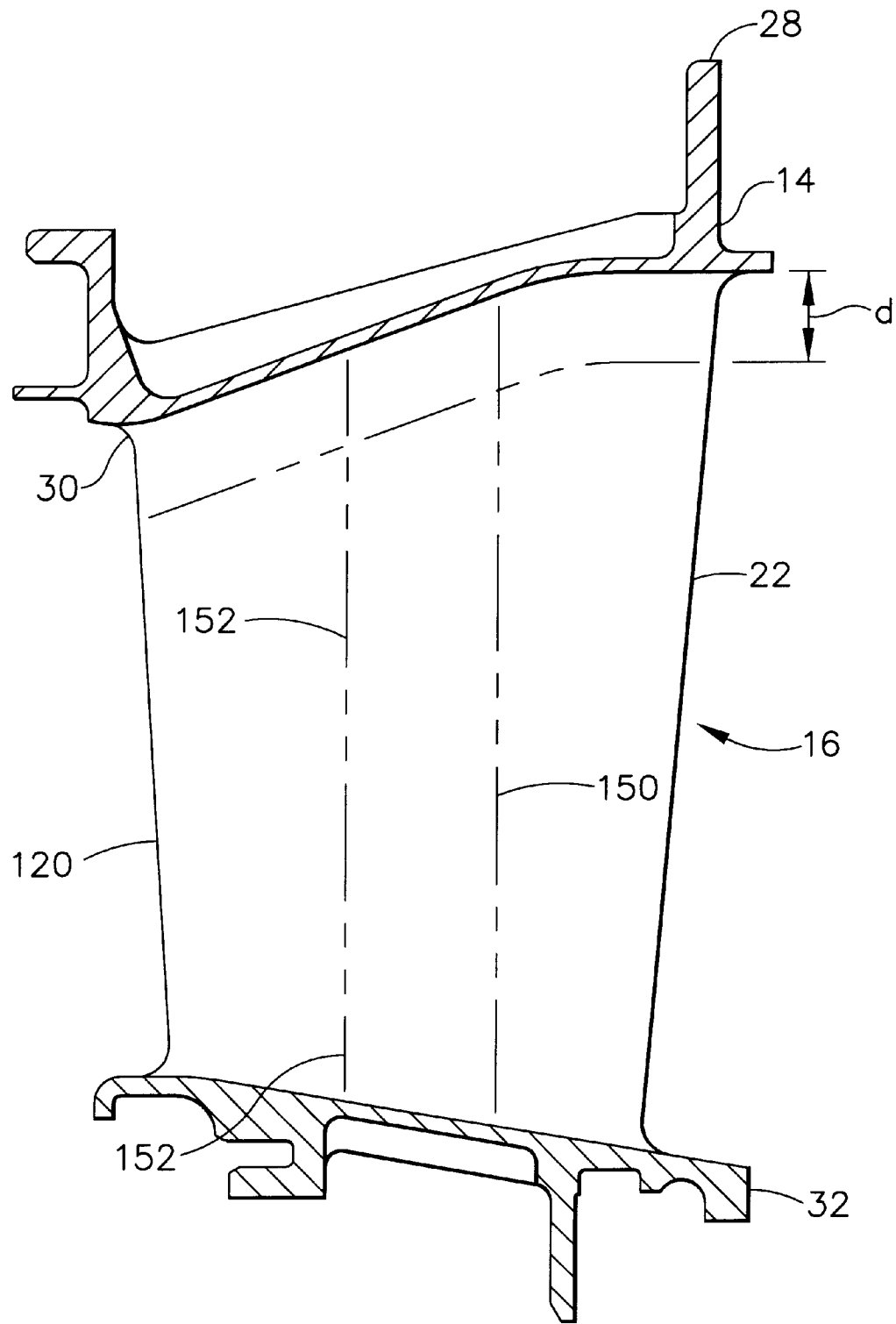
FIG. 3 is a cross-section of a new nozzle segment of FIG. 1 that includes thermal barrier coating applied in accordance with the present invention.

Referring now to FIGS. 2 and 3, a cross-section of a new nozzle segment of FIG. 1 that includes thermal barrier coating applied in accordance with the present invention is depicted. All that has been said above for the nozzle segment of FIG. 2 is also applicable to the nozzle segment of FIG. 3, except for the following. When the current invention is applied to a new nozzle segment, it is not necessary to apply the TBC to the leading edge from radius 30 to base 32 and back to line 34 bisecting airfoil body 16. The present invention contemplates applying the TBC by the methods set forth above to the airfoil along a band from the leading edge 120 to at least about ⅔ of the distance to the trailing edge as indicated by line 150 spanning the airfoil on the concave side and to at least about ⅓ of the distance from the leading edge 120 as indicated by line 152 spanning the airfoil. and for a distance d below radius 30 sufficient to reduce the cumulative stress below the fillet radius toward the base from a combination of mechanically-induced stresses resulting from geometric considerations and service-induced stresses. In a preferred embodiment, for airfoils such as found in a CF6 engine, the band from the leading edge to the training edge extends for at least about 1.5 inches and preferably for at least about 1.8 inches. Once again, the preferred distance "d", defining the width of the band for applications such as found in the CF6 is at least about 0.5", an most preferably about 0.5–0.6", below radius 30. although this distance will vary among designs and service conditions encountered by such designs. This minimizes the amount of TBC that must be applied to the airfoils, providing the additional advantages of reduced weight, reduced processing time and reduces cost.

The TBC wrap of the present invention is a new concept for high pressure turbine applications. The use of this wrap as set forth above, by extending the TBC below fillet region 30 and onto the flow path surfaces of the airfoil body will result in decreased metal temperatures, a more balanced thermal design and reduced peak stresses. Whereas the prior art airfoil design experienced a temperature gradient of about 80–100° F. over a distance of about ¼", the present invention lowers the thermal gradient to about 50–80° F. over a distance of about ½". This decrease is expected to result in at least a 50% improvement in LCF life, which is a conservative estimate. Along with lower stresses and lower temperatures in this region, there will be reduced incidents of cracking and burning.

Although the present invention has been described in connection with specific examples and embodiments, those skilled in the art will recognize that the present invention is capable of other variations and modifications within its scope. These examples and embodiments are intended as typical of. rather than in any way limiting on, the scope of the present invention as presented in the appended claims.

What is claimed is:

1. An improved airfoil, the airfoil having flow path surfaces that include a leading edge, a trailing edge, a concave side extending between the leading and trailing edges on a pressure side of the airfoil, a convex side extending between the leading and trailing edge opposite the pressure side of the airfoil, an outer band perimeter that includes a tip portion and an outer band portion of the airfoil, and a fillet radius extending from the outer band portion, the fillet radius forming a smooth contour between the outer band portion and the leading edge, the trailing edge, the concave side of the blade and the convex side of the blade, the improvement comprising:

a thermal barrier coating system that extends over a preselected region of the flow path surface that includes the outer band perimeter, the fillet radius and at least a portion of the flow path surface on at least one side of the airfoil between the trailing edge and about a midpoint between the trailing edge and the leading edge of the airfoil for a distance below the fillet radius sufficient to reduce cumulative stresses resulting from a combination of mechanically-induced stresses from the fillet radius and service-induced thermal stresses, the thermal barrier coating system including a bond coat applied over the preselected region of the airfoil substrate, an environmental aluminiding coating applied over at least the bond coat and a ceramic coating having low thermal conductivity applied over the bond coat and the aluminide coating.

2. An airfoil for service in the turbine portion of a gas turbine engine comprised of:

flow path surfaces that include a leading edge, a trailing edge, a concave side extending between the leading and trailing edges on a pressure side of the airfoil, a convex side extending between the leading and trailing edge opposite the pressure side of the airfoil and an outer band perimeter that includes a tip portion and an outer band portion of the airfoil, and a fillet radius extending from the outer band portion, the fillet radius forming a smooth contour between the outer band portion and the leading edge, the trailing edge, the concave side of the airfoil and the convex side of the airfoil; and a base integrally attached to the airfoil opposite the outer band perimeter;

the airfoil having a thermal barrier coating system that coats the fillet radius, the outer band perimeter and a leading edge region of the flow path surfaces, the leading edge region including the concave side and the convex side of the airfoil from the leading edge to about a line bisecting the airfoil between the leading edge and the trailing edge and spanning the airfoil from the fillet radius to the base, and a preselected region including at least a portion of the flow path surface on at least one side of the airfoil between the trailing edge and about a line bisecting the airfoil between the trailing edge and the leading edge for a preselected distance below the fillet radius toward the base sufficient to reduce cumulative stresses in a region of the fillet radius resulting from a combination of mechanically-induced stresses from the fillet radius and service-induced thermal stresses in the region, the thermal barrier coating system being continuous with the thermal barrier coating system in the leading edge region for the preselected distance, the thermal barrier coating system including a bond coat applied over the preselected region of the airfoil substrate, an environmental aluminiding coating applied over at least the bond coat and a ceramic coating having low thermal conductivity applied over the bond coat and the aluminide coating.

3. The airfoil of claim 2 wherein the thermal barrier coating system that extends over the preselected region of the airfoil has a maximum coating thickness at the outer band perimeter, the thickness of the coating decreasing at a preselected rate along the preselected distance from the fillet radius toward the base to reduce stresses from service-related thermal gradients.

4. The airfoil of claim 2 wherein the preselected distance over which the thermal barrier coating extends is at least about 20% of a span of the airfoil between the fillet radius and the base.

5. The airfoil of claim 2 wherein the preselected distance over which the thermal barrier coating extends is at least about 0.5 inches.

6. The airfoil of claim 2 wherein the preselected distance is about 0.5–0.6 inches.

7. The airfoil of claim 2 wherein the preselected region on a portion of the flow path surface is located on the convex side of the airfoil.

8. The airfoil of claim 2 wherein the preselected region on a portion of the flow path surface is located on the concave side of the airfoil.

9. The airfoil of claim 2 wherein the thermal barrier coating system coats at least the preselected region for a distance extending at least about 0.9 inches from the coated leading edge region toward the trailing edge.

10. The airfoil of claim 3 wherein the preselected rate is about 0.020 to about 0.15 inches per inch.

11. The airfoil of claim 2 wherein the thermal barrier coating system that extends over the preselected region of the airfoil has a substantially constant coating thickness from fillet radius toward the base to reduce stresses from service-related thermal gradients, the thermal barrier coating terminating at the preselected distance.

12. The airfoil of claim 2 wherein the bond coat is applied by air plasma spraying along a line-of-sight extending from the trailing edge toward the leading edge.

13. The airfoil of claim 2 wherein the ceramic coating is applied by air plasma spraying along a line-of-sight extending from the trailing edge toward the leading edge.

14. The airfoil of claim 2 wherein the bond coat is an MCrAlY in which M is at least one element selected from the group consisting of Ni, Co, and Fe and X is at least one element selected from the group consisting of Ti, Ta, Ru, Pt, Si, B, C, Hf and Zr.

15. The airfoil of claim 2 wherein the ceramic coating is YSZ.

16. An airfoil for service in the turbine portion of a gas turbine engine comprised of:

flow path surfaces that include a leading edge, a trailing edge, a concave side extending between the leading and trailing edges on a pressure side of the airfoil, a convex side extending between the leading and trailing edge opposite the pressure side of the airfoil and an outer band perimeter that includes a tip portion and an outer band portion of the airfoil, and a fillet radius extending from the outer band portion , the fillet radius forming a smooth contour between the outer band portion and the leading edge, the trailing edge, the concave side of the airfoil and the convex side of the airfoil;

a base integrally attached to the airfoil opposite the outer band perimeter;

the airfoil having a thermal barrier coating system that coats the outer band perimeter, the fillet radius and a region extending from the leading edge to at least about ⅔ of the distance to the trailing edge, and from the fillet radius for a preselected distance below the fillet radius toward the base sufficient to reduce cumulative stresses in a region of the fillet radius resulting from a combination of mechanically-induced stresses from the fillet radius and service-induced thermal stresses in the region, the thermal barrier coating system including a bond coat, an environmental aluminiding coating applied over at least the bond coat and a ceramic coating having low thermal conductivity applied over the bond coat and the aluminide coating.

17. The airfoil of claim 16 wherein the thermal barrier coating system that extends over the preselected region of the airfoil has a maximum coating thickness at the outer band perimeter, the thickness of the coating decreasing at a preselected rate along the preselected distance from the fillet radius toward the base to reduce stresses from service-related thermal gradients.

18. The airfoil of claim 16 wherein the preselected distance over which the thermal barrier coating extends is at least about 20% of a span of the airfoil between the fillet radius and the base.

19. The airfoil of claim 16 wherein the preselected distance over which the thermal barrier coating extends is at least about 0.5 inches.

20. The airfoil of claim 16 wherein the preselected distance is about 0.5–0.6 inches.

21. The airfoil of claim 16 wherein the region extending from the leading edge is located on the convex side of the airfoil.

22. The airfoil of claim 16 wherein the region extending from the leading edge is located on the concave side of the airfoil.

23. The airfoil of claim 16 wherein the thermal barrier coating system coats from the leading edge at least about 1.8 inches toward the trailing edge.

24. The airfoil of claim 17 wherein the preselected rate is about 0.020 to about 0.15 inches per inch.

25. The airfoil of claim 16 wherein the thermal barrier coating system has a substantially constant coating thickness from fillet radius toward the base to reduce stresses from service-related thermal gradients, the thermal barrier coating terminating at the preselected distance.

* * * * *